(12) United States Patent
Covington et al.

(10) Patent No.: US 10,287,026 B2
(45) Date of Patent: May 14, 2019

(54) POWER DEMAND ANTICIPATION SYSTEMS FOR ROTORCRAFT

(71) Applicant: Bell Helicopter Textron Inc., Fort Worth, TX (US)

(72) Inventors: Charles Eric Covington, Fort Worth, TX (US); Joseph Schaeffer, Fort Worth, TX (US); Robert Earl Worsham, II, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 182 days.

(21) Appl. No.: 15/424,801

(22) Filed: Feb. 4, 2017

(65) Prior Publication Data

US 2018/0222597 A1   Aug. 9, 2018

(51) Int. Cl.
| | |
|---|---|
| *B64D 35/00* | (2006.01) |
| *B64C 13/50* | (2006.01) |
| *B64C 27/04* | (2006.01) |
| *B64D 31/06* | (2006.01) |
| *F02C 9/28* | (2006.01) |
| *G05B 13/00* | (2006.01) |

(52) U.S. Cl.
CPC ............ *B64D 35/00* (2013.01); *B64C 13/503* (2013.01); *B64C 27/04* (2013.01); *B64D 31/06* (2013.01); *F02C 9/28* (2013.01); *G05B 13/00* (2013.01); *F05D 2220/323* (2013.01); *F05D 2270/313* (2013.01)

(58) Field of Classification Search
CPC ...... B64D 35/00; B64D 31/06; B64C 13/503; B64C 27/04; F02C 9/28; G05B 13/00; G05D 1/00; F05D 2220/323; F05D 2270/313
See application file for complete search history.

(56) References Cited

U.S. PATENT DOCUMENTS 4,093,952 A * 6/1978 Taylor ...................... G01S 1/14
                                                    342/413
4,600,870 A * 7/1986 Martin ..................... G05B 9/03
                                                    318/490

(Continued)

OTHER PUBLICATIONS

European Exam Report; Application No. 18154777.9; European Patent Office; dated Jul. 25, 2018.

(Continued)

*Primary Examiner* — Thomas E Worden
(74) *Attorney, Agent, or Firm* — Lawrence Youst PLLC (57) ABSTRACT

A power demand anticipation system for a rotorcraft includes an engine subsystem having an engine with a power output. The power demand anticipation system also includes one or more sensors including a cyclic control sensor. The one or more sensors are operable to detect one or more flight parameters of the rotorcraft to form sensor data including a cyclic control position. A power demand anticipation module is in data communication with the engine subsystem and the one or more sensors. The power demand anticipation module is operable to anticipate a power demand of the engine using the sensor data to form a power demand anticipation signal. The engine subsystem is operable to adjust the power output of the engine based on the power demand anticipation signal received from the power demand anticipation module.

20 Claims, 4 Drawing Sheets

(56) References Cited

U.S. PATENT DOCUMENTS

| | | | | |
|---|---|---|---|---|
| 5,265,826 A * | 11/1993 | Ebert | ............ | G05D 1/0858 |
| | | | | 244/17.13 |
| 5,429,089 A * | 7/1995 | Thornberg | ............ | F02D 31/001 |
| | | | | 123/352 |
| 5,901,272 A * | 5/1999 | Schaefer, Jr. | ......... | G01P 13/025 |
| | | | | 701/7 |
| 6,818,883 B2 * | 11/2004 | Rockinger | ............ | G01V 8/10 |
| | | | | 250/221 |
| 7,873,445 B2 | 1/2011 | Schaeffer | | |
| 7,931,231 B2 | 4/2011 | Cherepinsky et al. | | |
| 8,275,500 B2 | 9/2012 | Buehman | | |
| 8,473,124 B2 | 6/2013 | Shue et al. | | |
| 8,768,598 B2 | 7/2014 | McCollough | | |
| 2003/0094001 A1 * | 5/2003 | Desai | ............ | B64C 27/001 |
| | | | | 60/791 |
| 2008/0283671 A1 * | 11/2008 | Cherepinsky | ......... | B64C 13/503 |
| | | | | 244/195 |
| 2009/0234554 A1 * | 9/2009 | Buehman | ............ | F02C 9/56 |
| | | | | 701/100 |
| 2013/0291550 A1 | 11/2013 | Weinzierl et al. | | |
| 2015/0274282 A1 * | 10/2015 | Kim | ............ | B64C 13/503 |
| | | | | 701/3 |
| 2016/0052634 A1 * | 2/2016 | Almond | ............ | B64C 39/024 |
| | | | | 701/10 |
| 2017/0292491 A1 * | 10/2017 | Thiriet | ............ | F01D 19/00 |

OTHER PUBLICATIONS

European Search Report; Application No. 18154777.9; European Patent Office; dated Jul. 3, 2018.

\* cited by examiner

Fig.2

POWER DEMAND ANTICIPATION SYSTEMS FOR ROTORCRAFT

TECHNICAL FIELD OF THE DISCLOSURE

The present disclosure relates, in general, to power demand anticipation systems for use on rotorcraft and, in particular, to power demand anticipation systems capable of utilizing rotorcraft data from various sources, including, but not limited to, cyclic control position, to anticipate the power demand on an engine.

BACKGROUND

The power demand on the engine of a rotorcraft, such as a helicopter, can vary over time based on the operation being performed. For example, an increased power demand may be placed on an engine during helicopter takeoff or during some maneuvers, such as a fixed collective takeoff. Such increased power demand can result in low rotor rotational speed, or "rotor droop," in which the engine cannot drive the rotor at sufficient speed to maintain flight. Some rotorcraft lack the ability to anticipate power demand and must wait for an error in rotor speed or torque to occur before adjusting engine output. Because engine output is increased or decreased after the rotor error, however, such rotorcraft are prone to rotor droop or overshoot, predisposing the rotorcraft to operational hazards and inefficiencies. Power demand anticipation can help maintain rotor speed within a selected range no matter the operation being performed by the rotorcraft, which directly impacts rotor speed performance. Some helicopters utilize the collective control of their main rotor blades to anticipate power demand on the engine. When such a helicopter experiences a change in power demand due to factors unrelated to the collective control, however, the helicopter may fail to anticipate or provide a timely power output response. Accordingly, a need has arisen for a power demand anticipation system that utilizes sensor data, non-collective input and/or other data to effectively and efficiently anticipate power demand on an engine to improve rotorcraft performance.

SUMMARY

In a first aspect, the present disclosure is directed to a power demand anticipation system for a rotorcraft including an engine subsystem having an engine with a power output. The power demand anticipation system also includes one or more sensors including a cyclic control sensor. The one or more sensors are operable to detect one or more flight parameters of the rotorcraft to form sensor data including a cyclic control position. A power demand anticipation module is in data communication with the engine subsystem and the one or more sensors. The power demand anticipation module is operable to anticipate a power demand of the engine using the sensor data to form a power demand anticipation signal. The engine subsystem is operable to adjust the power output of the engine based on the power demand anticipation signal received from the power demand anticipation module.

In some embodiments, the engine subsystem may adjust the power output of the engine before the power demand anticipated by the power demand anticipation module is applied to the engine. In certain embodiments, the power demand anticipation system may include one or more actuators each operable to move a portion of the rotorcraft, and a control laws module operable to generate one or more commands to move the one or more actuators based on the sensor data to form one or more actuator position commands. In such embodiments, the power demand anticipation module may be operable to anticipate the power demand of the engine using the one or more actuator position commands to form the power demand anticipation signal. The one or more actuators may include one or more main rotor actuators. In some embodiments, the power demand anticipation system may include one or more actuators each positionable between a plurality of actuator positions to move a portion of the rotorcraft based on the sensor data. In such embodiments, the power demand anticipation module may be operable to anticipate the power demand of the engine using the actuator positions to form the power demand anticipation signal.

In certain embodiments, the power demand anticipation system may include a maneuver detection module operable to detect a maneuver performed by the rotorcraft based on the sensor data. In such embodiments, the power demand anticipation module may be operable to anticipate the power demand of the engine based on the maneuver to form the power demand anticipation signal. In some embodiments, the maneuver detected by the maneuver detection module may be a fixed collective takeoff or translating off an elevated platform. In certain embodiments, the one or more sensors may include an altitude sensor and the maneuver detection module may use altitude data from the altitude sensor to detect the rotorcraft translating off the elevated platform.

In some embodiments, the engine subsystem may include an engine interface having a governor, the engine interface receiving the power demand anticipation signal for utilization by the governor to adjust the power output of the engine. In certain embodiments, the power demand anticipation module may be implemented on a flight control computer. In some embodiments, the one or more sensors may include at least one of an airspeed sensor, an altitude sensor, a wind velocity sensor or a collective control sensor.

In a second aspect, the present disclosure is directed to a method for anticipating power demand for an engine of a rotorcraft. The method includes receiving one or more flight parameters from one or more sensors to form sensor data; anticipating a power demand of the engine using the sensor data to form a power demand anticipation signal; and sending the power demand anticipation signal to an engine subsystem to enable the engine subsystem to adjust a power output of the engine based on the power demand anticipation signal.

The method may include generating one or more commands to move one or more actuators of the rotorcraft based on the sensor data to form one or more actuator position commands; wherein anticipating the power demand of the engine using the sensor data to form the power demand anticipation signal further comprises anticipating the power demand of the engine using the one or more actuator position commands to form the power demand anticipation signal. The method may include positioning one or more actuators of the rotorcraft into one of a plurality of actuator positions to move a portion of the rotorcraft using the sensor data; wherein anticipating the power demand of the engine using the sensor data to form the power demand anticipation signal further comprises anticipating the power demand of the engine using the actuator position to form the power demand anticipation signal. The method may include filtering the power demand anticipation signal to remove a steady component and shaping the power demand anticipation signal to match a droop associated with the one or more flight parameters; scaling a cyclic control position to expected revolutions per minute error; or adjusting the power demand anticipation signal based on an ambient condition including at least one of airspeed, altitude or air temperature.

In a third aspect, the present disclosure is directed to a rotorcraft including a fuselage, a rotor hub assembly rotatable relative to the fuselage, an engine subsystem including an engine having a power output to provide rotational energy to the rotor hub assembly and one or more sensors including a cyclic control sensor. The one or more sensors are operable to detect one or more flight parameters of the rotorcraft to form sensor data including a cyclic control position. The rotorcraft also includes a flight control computer in data communication with the engine subsystem and the one or more sensors. The flight control computer includes a power demand anticipation module operable to anticipate a power demand of the engine using the sensor data to form a power demand anticipation signal. The engine subsystem is operable to adjust the power output of the engine based on the power demand anticipation signal received from the power demand anticipation module. In some embodiments, the rotorcraft may be a fly-by-wire rotorcraft. In certain embodiments, the flight control computer may be implemented using a full authority plus augmentation flight control system or a three-loop flight control system.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
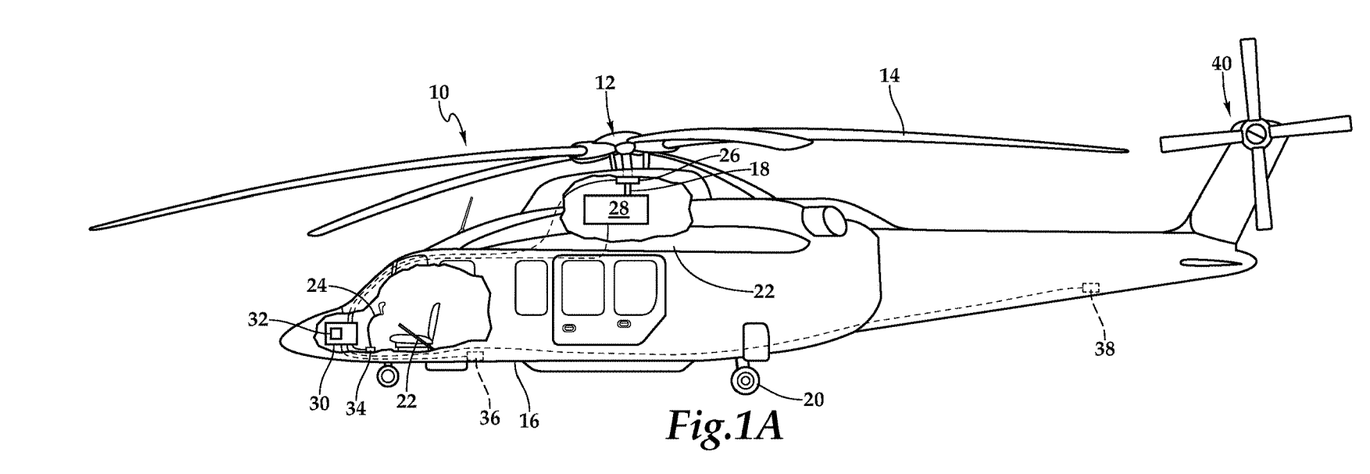
FIGS. 1A-1B are schematic illustrations of an exemplary rotorcraft utilizing a power demand anticipation system in accordance with embodiments of the present disclosure.
Figure 1B:
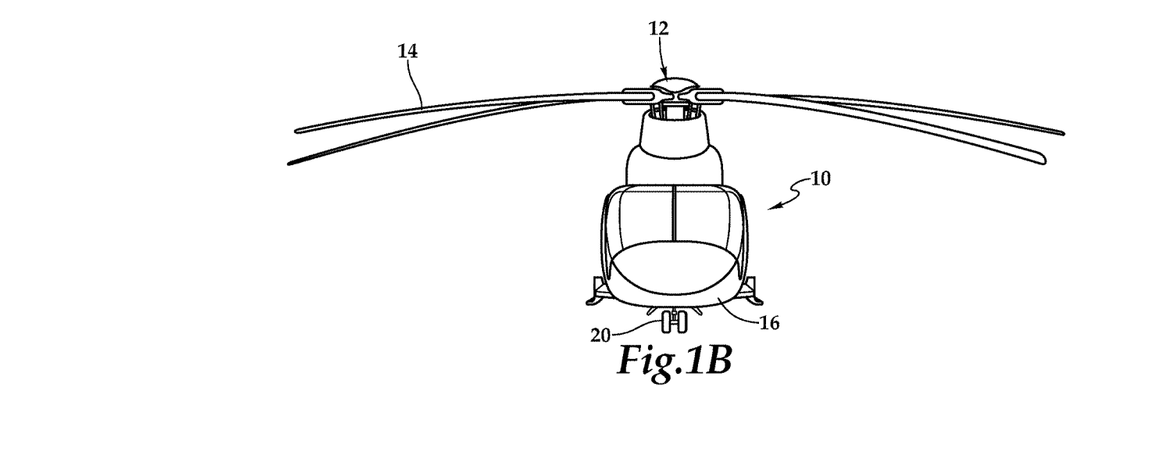

Referring to FIGS. 1A and 1B in the drawings, a rotorcraft implementing a power demand anticipation system is schematically illustrated and generally designated 10. Rotorcraft 10 has a rotor hub assembly 12, which includes a plurality of rotor blade assemblies 14. Rotor hub assembly 12 is rotatable relative to a fuselage 16 of rotorcraft 10. Rotor hub assembly 12 is supported atop rotorcraft 10 by a mast 18. A landing gear system 20 provides ground support for rotorcraft 10. The pitch of rotor blade assemblies 14 can be collectively and/or cyclically manipulated to selectively control direction, thrust and lift of rotorcraft 10. A collective control 22 may be used to control the altitude of rotorcraft 10 by simultaneously changing the pitch angle of all rotor blade assemblies 14 independently of their position. Therefore, if a collective input is made by collective control 22, the pitch angle of all rotor blade assemblies 14 change simultaneously and equally, resulting in rotorcraft 10 either increasing or decreasing in altitude. A cyclic control 24 may be used to control the attitude and airspeed of rotorcraft 10 by controlling the pitch of rotor blade assemblies 14 cyclically. More specifically, the relative pitch, or feathering angle, of each of rotor blade assemblies 14 will vary as they rotate. Unless otherwise indicated, as used herein, "or" does not require mutual exclusivity. The variation in relative pitch has the effect of varying the angle of attack of, and thus the lift generated by, each rotor blade assembly 14 as it rotates. Thus, if cyclic control 24 is moved forward or backward, a rotor disk, which is part of a main rotor actuation assembly 26 to which rotor blade assemblies 14 are coupled, tilts forward or backward and thrust is produced in the forward direction or backward direction, respectively. Similarly, if cyclic control 24 is moved to the right or to the left, the rotor disk tilts to the right or left and thrust is produced in the right direction or left direction, respectively.

Rotorcraft 10 implements a power demand anticipation system that anticipates power demand on an engine 28. Engine 28 generates a power output to provide rotational energy to rotor hub assembly 12. Unlike previous power demand anticipation systems that use only the collective position of rotor blade assemblies 14 to determine power demand on engine 28, the power demand anticipation system of the illustrative embodiments utilizes data from a wide variety of sources to determine the power demand on engine 28 before such power demand actually occurs. Rotorcraft 10 includes a flight control computer 30 implementing a power demand anticipation module 32. In the illustrated embodiment, rotorcraft 10 is a fly-by-wire rotorcraft.

In some embodiments, power demand anticipation module 32 may use sensor data from sensors 34, 36, 38 to anticipate a power demand on engine 28. Sensors 34, 36, 38 detect various flight parameters of rotorcraft 10, such as the position or motion of cyclic control 24, airspeed, altitude and/or wind velocity, among others. In other embodiments, power demand anticipation module 32 may utilize commands issued by a control laws module implemented by flight control computer 30 to anticipate a power demand on engine 28. In particular, the commands utilized by power demand anticipation module 32 may be actuator position commands, based on control laws, that move main rotor actuation assembly 26 and/or other actuators on rotorcraft 10 based on the sensor data from sensors 34, 36, 38. Non-limiting examples of actuator position commands and other commands that may be utilized by power demand anticipation module 32 include cyclic actuator demands, collective actuator commands, any combination of rotor actuator commands, as may be used in mixed systems, directional actuator commands or the like. In other embodiments, power demand anticipation module 32 uses the positions of the actuators in rotorcraft 10, including main rotor actuation assembly 26, to anticipate the power demand on engine 28. In addition to the actuator positions of main rotor actuation assembly 26, power demand anticipation module 32 may also use the positions of actuators for a tail rotor 40 or any movable control surfaces on rotorcraft 10. Thus, the power demand anticipation system implemented by rotorcraft 10 may utilize a wide variety of data sources to anticipate power demand on engine 28, thereby improving rotorcraft performance and preventing drooping or overshooting of rotor hub assembly 12 when the power demand on engine 28 changes.

It should be appreciated that rotorcraft 10 is merely illustrative of a variety of aircraft that can implement the embodiments disclosed herein. Indeed, the power demand anticipation system may be utilized on any aircraft having one or more engines with a changing power demand. Other aircraft implementations can include hybrid aircraft, tiltrotor aircraft, tiltwing aircraft, quad tiltrotor aircraft, unmanned aircraft, gyrocopters, airplanes and the like. As such, those skilled in the art will recognize that the power demand anticipation systems disclosed herein can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2, 3A-3B and 4A-4C, a power demand anticipation system is schematically illustrated and generally designated 100. Power demand anticipation system 100 is implemented on rotorcraft 102 and includes power demand anticipation module 104, executed on flight control computer 106, in data communication with one or more sensors 108, one or more actuators 110 and an engine subsystem 112 that includes an engine interface 114 and one or more engines 116. Flight control computer 106 includes a control laws module 118 that generates actuator position commands 120 to move actuators 110 based on sensor data 122 from sensors 108. Power demand anticipation module 104 uses sensor data 122 from sensors 108, actuator position commands 120 from control laws module 118, actuator positions 124 of actuators 110 or any combination thereof to anticipate the power demand from engine 116 to form a power demand anticipation signal 126 that is transmitted to engine interface 114 so that governor 128 can adjust the power output of engine 116. Governor 128 adjusts the power output of engine 116 before application of the power demand anticipated by power demand anticipation module 104 to engine 116 to maintain the rotational speed of one or more rotors of rotorcraft 102 within a predetermined range.

Figure 2:
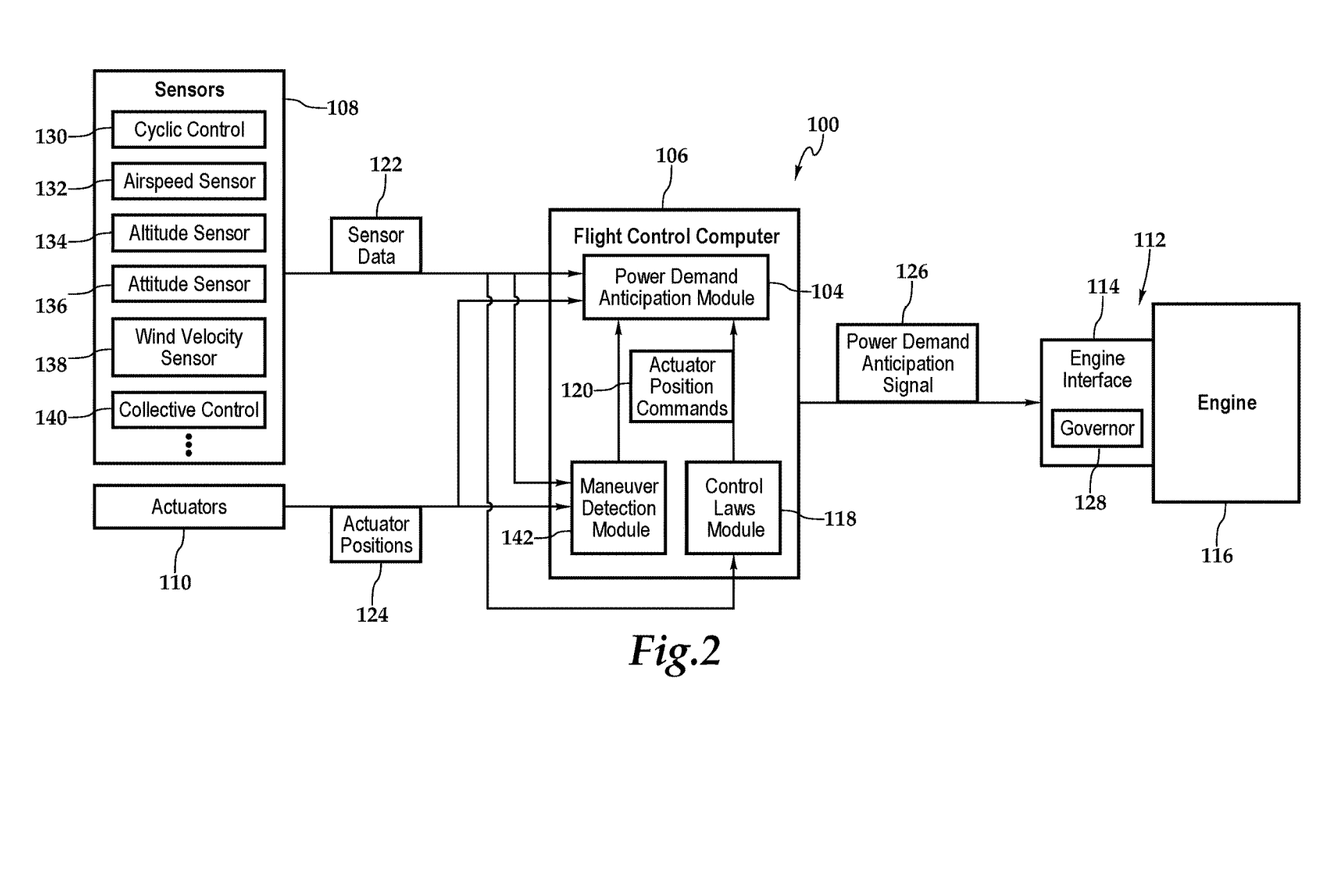
FIG. 2 is a schematic illustration of a power demand anticipation system in accordance with embodiments of the present disclosure.

Sensors 108 detect flight parameters of rotorcraft 102 to form sensor data 122 that is utilized by power demand anticipation module 104, either directly or indirectly. Sensors 108 may include a cyclic control sensor 130 that detects the position or motion of a cyclic control, which may form part of sensor data 122 transmitted to power demand anticipation module 104. Sensors 108 may include an airspeed sensor 132, which may utilize a doppler radar, global positioning satellites or other airspeed detection techniques. Sensors 108 may also include an altitude sensor 134, such as a radar altimeter, an attitude sensor 136 and/or a wind velocity sensor 138. Sensors 108 may further include a collective control sensor 140 that detects a position or movement of the collective control of rotorcraft 102. Indeed, the different types of sensors 108 that may be used by power demand anticipation system 100 are numerous, non-limiting examples of which include a weight sensor, such as a cargo weight sensor, a rotor speed sensor, an NP sensor, a nacelle tilt angle sensor, a helicopter or tiltrotor aircraft pylon angle sensor, a power turbine output speed sensor, a gas temperature sensor, a throttle position sensor, a compressor speed sensor, an engine torque output sensor, an actuator position sensor, a pressure altitude sensor, a compressor air temperature sensor, a fuel metering valve position sensor or the like.

Control laws module 118 may generate commands to maintain a suitable yaw, pitch and roll of rotorcraft 102, as well as issue commands to maintain the power output required by engine 116 to maintain these three axes. Control laws module 118 may also issue other commands such as a G command, pitch rate feedback or C command, to regulate flight of rotorcraft 102. Actuators 110 may include any actuator that moves a portion of rotorcraft 102, such as rotor blade assemblies 144, based on sensor data 122. Actuators 110 may each be movable between a plurality of actuator positions 124. Actuators 110 may include main rotor actuators that are operable to adjust the pitch angle of rotor blade assemblies 144, either collectively or cyclically. Non-limiting examples of other types of actuators 110 include tail rotor actuators or control surface actuators.

In some embodiments, power demand anticipation module 104 anticipates a power demand on engine 116 using sensor data 122 to form power demand anticipation signal 126, which is received by engine interface 114 and used by governor 128 to adjust the power output of engine 116. For example, power demand anticipation module 104 may receive sensor data 122 that includes a cyclic control position, detected by cyclic control sensor 130, which adjusts the cyclic pitch of rotor blade assemblies 144 such that an increased power output is demanded from engine 116. In such an example, power demand anticipation signal 126 causes engine interface 114 to increase the power output of engine 116. In other embodiments, power demand anticipation module 104 may indirectly use sensor data 122 via control laws module 118, thus utilizing any feedback terms issued by control laws module 118. In particular, power demand anticipation module 104 may anticipate the power demand from engine 116 using actuator position commands 120, which may be derived from sensor data 122 and utilize feedback terms, to form power demand anticipation signal 126. In other embodiments, power demand anticipation module 104 may indirectly utilize sensor data 122 by anticipating the power demand from engine 116 using actuator positions 124 to form power demand anticipation signal 126. In these embodiments, the actuator positions 124 may be based on sensor data 122 including, but not limited to, cyclic control sensor 130 or collective control sensor 140. Temporally, sensor data 122 is generated by sensors 108 before actuator position commands 120 are generated by control laws module 118, and actuator position commands 120 are generated before actuators 110 move into actuator positions 124. Therefore, in some embodiments it may be desirable to utilize data earlier in the temporal chain of events to provide additional time for engine 116 to meet the power demand indicated by power demand anticipation signal 126.

Power demand anticipation module 104 may also compensate for increases in power demand due to inputs in various axes, such as laterally or directionally, with differing ambient condition or vehicle state compensation schedules. In other embodiments, power demand anticipation module 104 may filter power demand anticipation signal 126 to remove one or more steady components, and/or shape power demand anticipation signal 126 to match a droop or overshoot associated with one or more flight parameters detected by sensors 108. Power demand anticipation module 104 may also adjust power demand anticipation signal 126 based on an ambient condition, such as altitude data from altitude sensor 134 or airspeed data from airspeed sensor 132. In embodiments in which power demand anticipation module 104 utilizes the cyclic control position detected by cyclic control sensor 130, power demand anticipation module 104 may scale the cyclic control position to nominal horsepower or expected revolutions per minute error. In yet other embodiments, power demand anticipation module 104, in generating power demand anticipation signal 126, may give differing weights to sensor data 122, actuator position commands 120 and actuator positions 124 according to a weighting algorithm. Power demand anticipation module 104 may also give differing weights to the data provided by the various sensors 108. For example, power demand anticipation module 104 may weigh the data from each of cyclic control sensor 130, altitude sensor 134 and collective control sensor 140 differently when generating power demand anticipation signal 126.

Figure 3A:
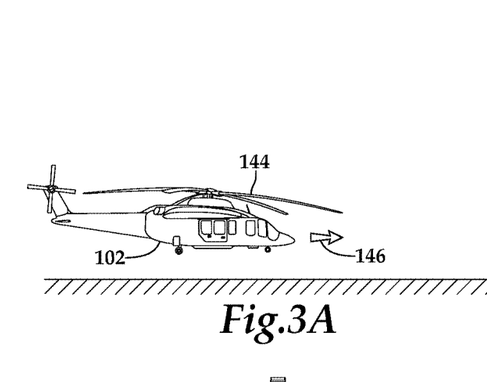
FIGS. 3A-3B are side views of a helicopter performing a fixed collective takeoff in accordance with embodiments of the present disclosure.
Figure 3B:
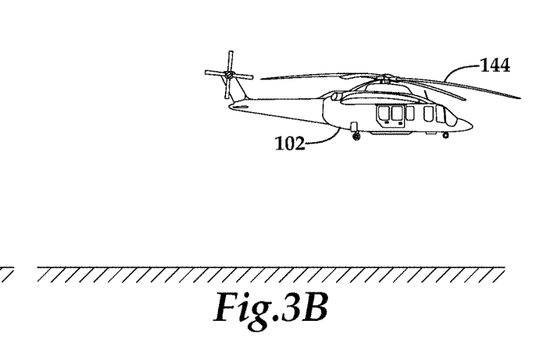

Power demand anticipation system 100 may also include a maneuver detection module 142 that detects a maneuver performed by rotorcraft 102 based on sensor data 122. In some embodiments, power demand anticipation module 104 may indirectly use sensor data 122 to form power demand anticipation signal 126 by processing the maneuver detected by maneuver detection module 142. FIGS. 3A-3B illustrate one example scenario in which the maneuver detection module 142 may be utilized. In FIGS. 3A-3B, rotorcraft 102 is performing a fixed collective takeoff maneuver. A fixed collective takeoff is a takeoff from a steady or in-ground-effect hover, as shown in FIG. 3A, typically at an altitude below the height-velocity diagram for rotorcraft 102 and without any collective variation. A fixed collective takeoff is typically accomplished by a slight forward cyclic position to establish a forward velocity 146 with minimal altitude loss. At some forward velocity 146, translational lift occurs to permit takeoff, as shown in FIG. 3B. During the time between the cyclic movement and altitude increase caused by the translational lift, rotorcraft 102 may not contact the ground. Because there is no change in the collective position of rotor blade assemblies 144 during a fixed collective takeoff, previous power demand anticipation systems that utilize only collective control fail to anticipate the additional power demand required during a fixed collective takeoff, causing rotor droop and other performance deficiencies. In the illustrative embodiments, however, a power demand change may be anticipated by power demand anticipation module 104 based on sensor data 122 from cyclic control sensor 130, airspeed sensor 132, a ground speed sensor or any combination thereof. Maneuver detection module 142 may use these flight parameters to make a determination that rotorcraft 102 is performing a fixed collective takeoff, and such determination may be used by power demand anticipation module 104 to form power demand anticipation signal 126.

Figure 4A:
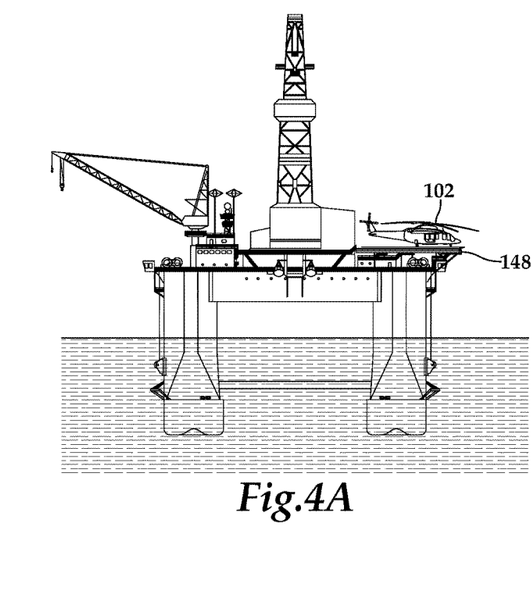
FIGS. 4A-4B are side views of a helicopter translating off an elevated platform in accordance with embodiments of the present disclosure.
Figures 4B, 4C:
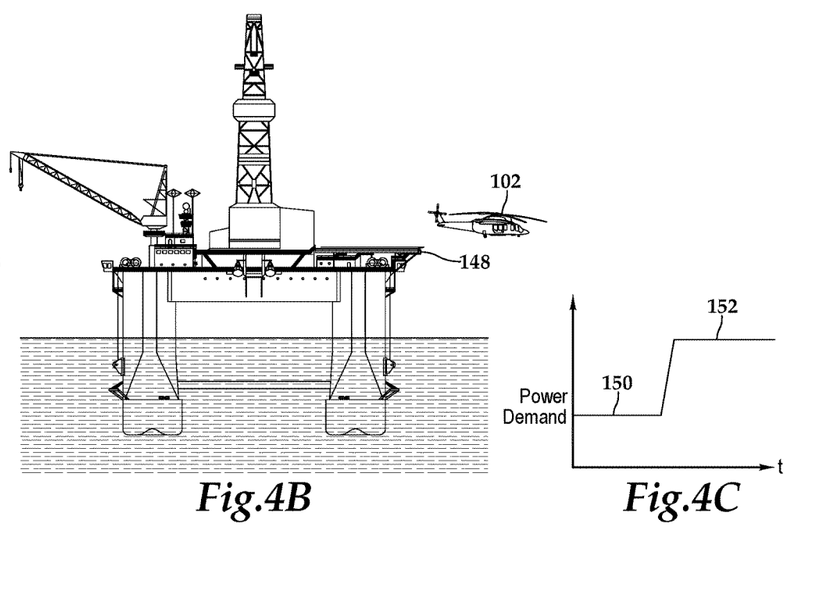
FIG. 4C is a graph showing power demand over time for the helicopter in FIGS. 4A-4B.

FIGS. 4A-4B illustrate rotorcraft 102 translating off of elevated platform 148. In translating off elevated platform 148, rotorcraft 102 rapidly transitions from an in-ground-effect hover, as shown in FIG. 4A, to an out-of-ground-effect hover, as shown in FIG. 4B. Such a transition causes an increase in power demand from engine 116. Maneuver detection module 142 may detect a sudden change in radar altitude from altitude sensor 134 in transitioning over the edge of elevated platform 148, indicating a pending increase in power demand due to rotorcraft 102 transitioning from in-ground-effect hover to out-of-ground-effect hover. Power demand 150 during the in-ground-effect hover shown in FIG. 4A is less than power demand 152 required during the out-of-ground-effect hover shown in FIG. 4B, as graphically shown in FIG. 4C. Power demand anticipation module 104 may anticipate this increased power demand shown in FIG. 4C by generating power demand anticipation signal 126 in response to maneuver detection module 142 detecting a translation off of elevated platform 148 so that engine 116 may increase its power output accordingly.

The maneuvers shown in FIGS. 3A-3B and 4A-4C illustrate that power demand anticipation systems that are limited to utilizing only collective control when anticipating power demand may fail to adequately anticipate power demand in various operational scenarios, leading to an undesirable reliance on error in rotor speed or torque before adjusting the power output of an engine. By using data from various sources on rotorcraft 102, such as sensor data 122, actuator position commands 120 or actuator positions 124, instead of being limited merely to using collective control input, power demand anticipation system 100 may anticipate the power demand from engine 116 in a timely, accurate and more efficient manner to provide a performance benefit for rotorcraft 102. Because power demand anticipation system 100 processes and computes power demand anticipation signal 126 at flight control computer 106 rather than at engine subsystem 112, anticipation processing is performed on the front end rather than the back end, thus allowing power demand anticipation module 104 to be retrofitted onto existing engines on various aircraft. Such front end processing may also provide a temporal advantage by anticipating the power demand on engine 116 at an earlier time.

Power demand anticipation signal 126 may also be sent on the same channel or bus used by existing engine interfaces or electronic engine control units to receive a collective input, thus allowing power demand anticipation module 104 to be retrofitted or used with such prior engine interfaces 114 or electronic engine control units. In one non-limiting example, power demand anticipation signal 126 may be transmitted on an ARINC-429 bus. In yet another non-limiting example, actuator position commands 120 may be computed at 50 hertz and power demand anticipation signal 126 may be transmitted at 50 hertz, although any frequency is contemplated within the illustrative embodiments that allows for effective power demand anticipation.

In some embodiments, flight control computer 106 may be part of a triplex system. In other non-limiting examples, flight control computer 106 may be part of a duplex or quad system. Power demand anticipation module 104 may be software or firmware implemented on flight control computer 106, and/or may incorporate or utilize a portion of the hardware components of flight control computer 106. While power demand anticipation system 100 is shown to be implemented in a fly-by-wire environment, power demand anticipation system 100 may also be utilized in other flight control systems, such as a conventional mechanical flight control system, an augmented mechanical flight control system or a full authority plus augmentation flight control system. Power demand anticipation system 100 may also be implemented on a variety of fly-by-wire flight control systems, including fly-by-wire control systems that have only basic or direct control laws that mimic a mechanical flight control system as a reversionary mode or for improved ballistic tolerance. Power demand anticipation system 100 may also be utilized in a model-following fly-by-wire flight control system or a flight control system with advanced control laws such as a three-loop flight control system. In some embodiments, governor 128 may include a fuel flow module that regulates the amount of fuel supply to engine 116, thereby controlling the power output of engine 116.

Figure 5:
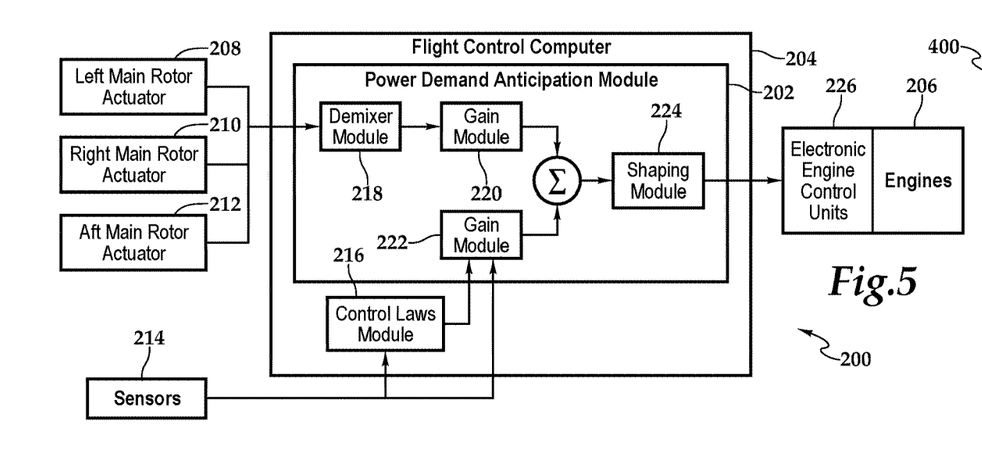
FIG. 5 is a schematic illustration of a power demand anticipation system in accordance with embodiments of the present disclosure.

Referring to FIG. 5 in the drawings, a power demand anticipation system is schematically illustrated and generally designated 200. Power demand anticipation module 202 is implemented on flight control computer 204 to anticipate the power demand on engines 206 based on left, right and aft main rotor actuators 208, 210, 212, sensor data from sensors 214 and commands issuing from control laws module 216. Data, such as actuator position data, from left, right and aft main rotor actuators 208, 210, 212 may be received and demixed by demixer module 218 to produce a term, such as C=f(L,R,A), which is then transmitted to a gain module 220 where a gain scheduling term is applied. Gain module 222 receives commands from control laws module 216 and sensor data from sensors 214 and may apply a gain scheduling term thereto. In some embodiments, the gain provided by gain modules 220, 222 may be any amplification or attenuation applied to the forward signal to achieve a desired response. Output from gain modules 220, 222 may be combined and processed through a shaping module 224, which may shape the incoming signal to form a final power demand anticipation signal that is transmitted to electronic engine control units 226 and used to adjust the power output of engines 206. In some embodiments, power demand anticipation system 200 may provide looser control at low speeds for improved performance, and tighter control at high speeds for reduced loads. The gain scheduling terms provided by gain modules 220, 222 may be based on airspeed, tight/loose mode or other conditions. In forming the power demand anticipation signal, power demand anticipation system 200 may also include a collective compensation baseline, as well as shaping networks or schedules on collective position or washed out cyclic at low airspeeds.

Figure 6:
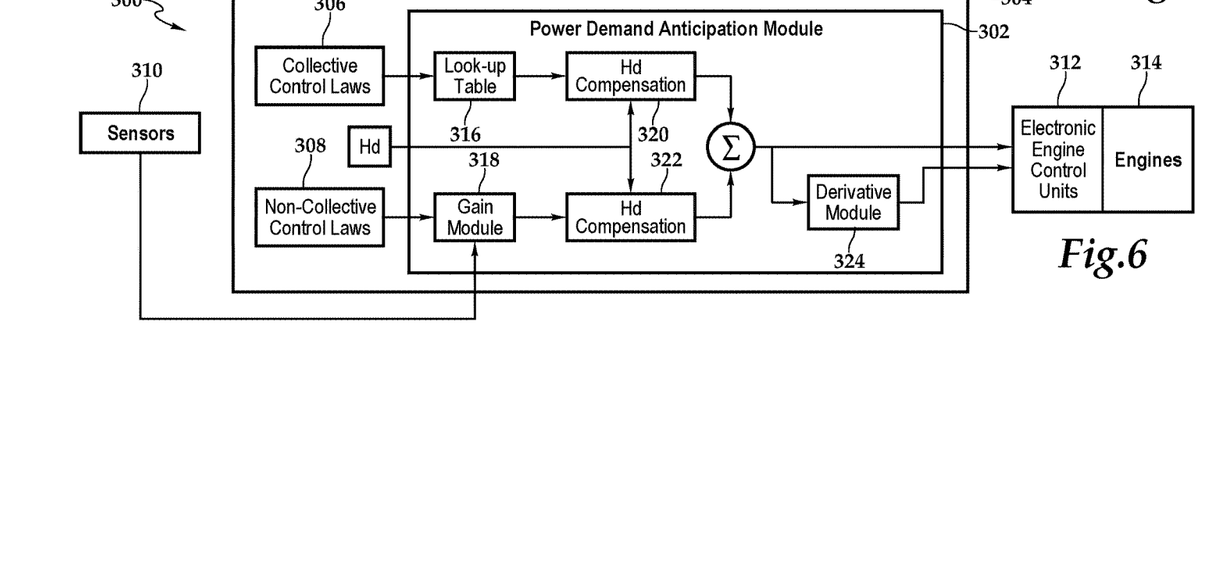
FIG. 6 is a schematic illustration of a power demand anticipation system in accordance with embodiments of the present disclosure.

Referring to FIG. 6 in the drawings, a power demand anticipation system is schematically illustrated and generally designated 300. Power demand anticipation module 302, implemented on flight control computer 304, utilizes collective control laws 306, non-collective control laws 308 and sensor data from sensors 310 to generate and transmit a power demand anticipation signal, and a derivative thereof, to electronic engine control units 312 that is used to adjust the power output of engines 314. Collective control laws 306 may be processed according to a scheduling term of lookup table 316, while non-collective control laws 308 and sensor data from sensors 310 may be processed by gain module 318. Hd, including density altitude, compensation 320, 322 may be applied before combining the signals to produce the power demand anticipation signal that is transmitted to electronic engine control units 312. In the illustrated embodiment, derivative module 324 generates a derivative of the power demand anticipation signal and supplies it to electronic engine control units 312. Electronic engine control units 312 may then use the power demand anticipation signal, and the derivative thereof, to adjust the power output of engines 314.

Figure 7:
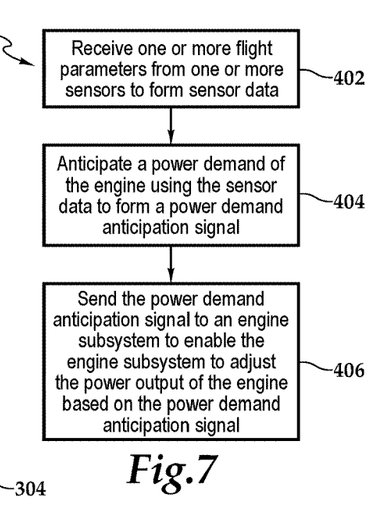
FIG. 7 is a flowchart of a method for anticipating power demand on a rotorcraft engine in accordance with embodiments of the present disclosure.

Referring to FIG. 7 in the drawings, a method for anticipating power demand for an engine of a rotorcraft is illustrated as flowchart 400. The method includes receiving one or more flight parameters from one or more sensors to form sensor data (step 402). The method includes anticipating a power demand of the engine using the sensor data to form a power demand anticipation signal (step 404). The method also includes sending the power demand anticipation signal to an engine subsystem to enable the engine subsystem to adjust the power output of the engine based on the power demand anticipation signal (step 406).

In some embodiments, the method may also include generating one or more commands to move one or more actuators of the rotorcraft based on the sensor data to form one or more actuator position commands, and step 404 may include anticipating the power demand of the engine using the one or more actuator position commands to form the power demand anticipation signal. In other embodiments, the method may include positioning one or more actuators of the rotorcraft into one of a plurality of actuator positions to move a portion of the rotorcraft using the sensor data, and step 404 may include anticipating the power demand of the engine using the actuator position to form the power demand anticipation signal. In certain embodiments, step 404 may include filtering the power demand anticipation signal to remove a steady component and/or shaping the power demand anticipation signal to match a droop associated with one or more flight parameters. In other embodiments, step 404 may include adjusting the power demand anticipation signal based on an ambient condition including at least one of airspeed, altitude or air temperature. In embodiments in which the rotorcraft sensors include a cyclic control sensor and the sensor data includes a cyclic control position, step 404 may include scaling the cyclic control position to expected revolutions per minute error.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The flight control computers of the present embodiments preferably include computing elements such as non-transitory computer readable storage media that include computer instructions executable by processors for controlling flight operations. The computing elements may be implemented as one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may be implemented as microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A power demand anticipation system for a rotorcraft comprising:
   an engine subsystem including an engine having a power output;
   a flight control computer including at least one processor;
   one or more sensors including a cyclic control sensor, the one or more sensors operable to detect one or more flight parameters of the rotorcraft to form sensor data including a cyclic control position;
   a maneuver detection module including at least a portion of the at least one processor of the flight control computer to detect a translating off an elevated platform maneuver performed by the rotorcraft based on the sensor data; and
   a power demand anticipation module including at least a portion of the at least one processor of the flight control computer in data communication with the engine subsystem and the one or more sensors, the power demand anticipation module portion of the at least one processor operable to anticipate a power demand of the engine based on detection of the translating off the elevated platform maneuver to form a power demand anticipation signal;
   wherein, the engine subsystem is operable to adjust the power output of the engine based on the power demand anticipation signal received from the flight control computer.

2. The power demand anticipation system as recited in claim 1, wherein the engine provides rotational energy to a rotor of the rotorcraft; and
   wherein the engine subsystem, upon receiving the power demand anticipation signal, preadjusts the power output of the engine to maintain rotational speed of the rotor within a predetermined range.

3. The power demand anticipation system as recited in claim 1, further comprising:
   one or more actuators each operable to move a portion of the rotorcraft;
   wherein a control laws module portion of the at least one processor generates one or more commands to move the one or more actuators based on the sensor data to form one or more actuator position commands; and
   wherein the power demand anticipation module portion of the at least one processor anticipates the power demand of the engine using the one or more actuator position commands to form a second power demand anticipation signal.

4. The power demand anticipation system as recited in claim 3, wherein the one or more actuators further comprise one or more main rotor actuators.

5. The power demand anticipation system as recited in claim 1, further comprising:
   one or more actuators each positionable between a plurality of actuator positions to move a portion of the rotorcraft based on the sensor data;
   wherein the power demand anticipation module portion of the at least one processor anticipates the power demand of the engine using the actuator positions to form a second power demand anticipation signal.

6. The power demand anticipation system as recited in claim 1, wherein the sensor data further comprises longitudinal cyclic control position;
   wherein the maneuver detection module portion of the at least one processor of the flight control computer is operable to detect a second maneuver performed by the rotorcraft based on the sensor data including the longitudinal cyclic control position; and
   wherein the power demand anticipation module portion of the at least one processor anticipates the power demand of the engine based on the second maneuver to form a second power demand anticipation signal.

7. The power demand anticipation system as recited in claim 1, wherein the maneuver detection module portion of the at least one processor of the flight control computer is operable to detect a fixed collective takeoff maneuver performed by the rotorcraft based on the sensor data;
   wherein the power demand anticipation module portion of the at least one processor anticipates the power demand of the engine based on detection of the fixed collective takeoff maneuver to form a second power demand anticipation signal.

8. The power demand anticipation system as recited in claim 1, wherein the one or more sensors further comprises an altitude sensor and the sensor data further comprises altitude data; and
   wherein the maneuver detection module portion of the at least one processor uses the altitude data from the altitude sensor to detect the rotorcraft translating off the elevated platform.

9. The power demand anticipation system as recited in claim 1, wherein the engine subsystem further comprises an engine interface having a governor, the engine interface receiving the power demand anticipation signal for utilization by the governor to adjust the power output of the engine.

10. The power demand anticipation system as recited in claim 1, wherein the one or more sensors further comprise at least one of an airspeed sensor, an altitude sensor, a wind velocity sensor, and a collective control sensor.

11. A method for anticipating power demand for an engine of a rotorcraft comprising:
- receiving one or more flight parameters from one or more sensors to form sensor data including a cyclic control position;
- detecting a translating off an elevated platform maneuver performed by the rotorcraft based on the sensor data;
- anticipating a power demand of the engine based on detection of the translating off the elevated platform maneuver to form a power demand anticipation signal; and
- sending the power demand anticipation signal to an engine subsystem to enable the engine subsystem to adjust a power output of the engine based on the power demand anticipation signal.

12. The method as recited in claim 11, further comprising:
- generating one or more commands to move one or more actuators of the rotorcraft based on the sensor data to form one or more actuator position commands;
- wherein anticipating the power demand of the engine further comprises anticipating the power demand of the engine using the one or more actuator position commands to form a second power demand anticipation signal.

13. The method as recited in claim 11, further comprising:
- positioning one or more actuators of the rotorcraft into one of a plurality of actuator positions to move a portion of the rotorcraft using the sensor data;
- wherein anticipating the power demand of the engine further comprises anticipating the power demand of the engine using the actuator position to form a second power demand anticipation signal.

14. The method as recited in claim 11, wherein anticipating the power demand of the engine further comprises filtering the power demand anticipation signal to remove a steady component and shaping the power demand anticipation signal to match a droop associated with the one or more flight parameters.

15. The method as recited in claim 11, wherein anticipating the power demand of the engine further comprises adjusting the power demand anticipation signal based on an ambient condition including at least one of airspeed or altitude.

16. The method as recited in claim 11, wherein the one or more sensors further comprises an altitude sensor and the sensor data further comprises altitude data, further comprising:
- detecting the rotorcraft translating off the elevated platform using the altitude data from the altitude sensor.

17. A rotorcraft comprising:
- a fuselage;
- a rotor hub assembly rotatable relative to the fuselage;
- an engine subsystem including an engine having a power output to provide rotational energy to the rotor hub assembly;
- a flight control computer including at least one processor in data communication with the engine subsystem;
- one or more sensors including a cyclic control sensor, the one or more sensors operable to detect one or more flight parameters of the rotorcraft to form sensor data including a cyclic control position;
- a maneuver detection module including at least a portion of the at least one processor of the flight control computer to detect a translating off an elevated platform maneuver performed by the rotorcraft based on the sensor data; and
- a power demand anticipation module including at least a portion of the at least one processor of the flight control computer operable to anticipate a power demand of the engine based on detection of the translating off the elevated platform maneuver to form a power demand anticipation signal;
- wherein, the engine subsystem is operable to adjust the power output of the engine based on the power demand anticipation signal received from the flight control computer.

18. The rotorcraft as recited in claim 17, wherein the rotorcraft further comprises a fly-by-wire rotorcraft.

19. The rotorcraft as recited in claim 17, wherein the flight control computer is implemented using a full authority plus augmentation flight control system.

20. The rotorcraft as recited in claim 17, wherein the flight control computer is implemented using a three-loop flight control system.

* * * * *